United States Patent
Kubo et al.

(10) Patent No.: US 9,762,298 B2
(45) Date of Patent: Sep. 12, 2017

(54) RADIO APPARATUS, RADIO CONTROL APPARATUS AND COMMUNICATION CONTROL METHOD

(71) Applicant: NTT DOCOMO, INC., Tokyo (JP)

(72) Inventors: Takahiro Kubo, Tokyo (JP); Takahiro Asai, Tokyo (JP); Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/028,245

(22) PCT Filed: Oct. 2, 2014

(86) PCT No.: PCT/JP2014/076382
§ 371 (c)(1),
(2) Date: Apr. 8, 2016

(87) PCT Pub. No.: WO2015/053161
PCT Pub. Date: Apr. 16, 2015

(65) Prior Publication Data
US 2016/0248485 A1    Aug. 25, 2016

(30) Foreign Application Priority Data
Oct. 8, 2013    (JP) ................................. 2013-211053

(51) Int. Cl.
*H04B 7/0413*    (2017.01)
*H04B 7/06*    (2006.01)
(Continued)

(52) U.S. Cl.
CPC .......... *H04B 7/0413* (2013.01); *H01Q 1/246* (2013.01); *H01Q 21/28* (2013.01); *H04B 7/0617* (2013.01);
(Continued)

(58) Field of Classification Search
CPC ....... H04L 2025/03414; H04L 25/0204; H04L 1/0057; H04B 7/0452; H04B 7/0413
(Continued)

(56) References Cited

U.S. PATENT DOCUMENTS

| 7,043,271 | B1 * | 5/2006 | Seto ..................... H01Q 3/2605 398/58 |
| 7,167,526 | B2 * | 1/2007 | Liang ................... H04B 7/0671 375/148 |

(Continued)

FOREIGN PATENT DOCUMENTS

| JP | 2001-102979 A | 4/2001 |
| JP | 2007-096775 A | 4/2007 |

(Continued)

OTHER PUBLICATIONS

International Search Report issued in PCT/JP2014/076382 mailed on Nov. 4, 2014 (2 pages).

(Continued)

*Primary Examiner* — Emmanuel Bayard
(74) *Attorney, Agent, or Firm* — Osha Liang LLP

(57) ABSTRACT

To reduce a bandwidth required for an optical transmission path (30) in a base station system including an RAU (21) for performing MIMO transmission using a plurality of antenna elements and a BBU (11), in a communication control method of the present invention, the BBU (11) transmits antenna weight coefficient information indicative of antenna weight coefficients of a plurality of antenna elements (205) and a transmission signal, and the RAU (21) multiplies the transmission signal from the BBU (11) by each of the antenna weight coefficients to generate weighted signals of the plurality of antenna elements (205), and transmits the weighted signals from the plurality of antenna elements (205).

6 Claims, 9 Drawing Sheets

(51) Int. Cl.
    *H04L 27/26*     (2006.01)
    *H01Q 1/24*     (2006.01)
    *H01Q 21/28*     (2006.01)
    *H04B 10/2575*     (2013.01)

(52) U.S. Cl.
    CPC ....... *H04B 7/0634* (2013.01); *H04B 10/2575* (2013.01); *H04L 27/2607* (2013.01); *H04L 27/2634* (2013.01)

(58) Field of Classification Search
    USPC .................................. 375/267, 299, 347, 349
    See application file for complete search history.

(56) References Cited

U.S. PATENT DOCUMENTS

| | | | | |
|---|---|---|---|---|
| 7,436,903 B2* | 10/2008 | Sandhu | H04B 7/0671 | 331/34 |
| 7,463,698 B2* | 12/2008 | Fujii | H04L 5/0023 | 327/291 |
| 7,532,660 B2* | 5/2009 | Chae | H04B 1/707 | 375/144 |
| 7,548,589 B2* | 6/2009 | Kim | H04B 7/0619 | 375/260 |
| 7,557,752 B2* | 7/2009 | Ban | H04L 25/0206 | 342/375 |
| 7,616,704 B2* | 11/2009 | Li | H04B 7/0617 | 375/260 |
| 7,676,007 B1* | 3/2010 | Choi | H04B 7/0617 | 375/267 |
| 7,764,744 B2* | 7/2010 | Choi | H04B 7/0634 | 370/203 |
| 7,843,889 B2* | 11/2010 | Kim | H04W 52/346 | 370/334 |
| 7,965,619 B2* | 6/2011 | Taira | H04B 7/0617 | 370/203 |
| 7,983,355 B2* | 7/2011 | Catreux | H04B 7/0615 | 375/295 |
| 8,000,293 B2* | 8/2011 | Mondal | H04B 7/0617 | 370/328 |
| 8,068,874 B2 | 11/2011 | Kuwahara et al. | | |
| 8,184,733 B2* | 5/2012 | Tanaka | H04B 7/08 | 375/267 |
| 8,462,714 B2* | 6/2013 | Taoka | H04B 7/0615 | 370/329 |
| 8,521,215 B2* | 8/2013 | Hirakawa | H04B 7/024 | 342/463 |
| 8,526,999 B2 | 9/2013 | Nakayama | | |
| 8,537,922 B2* | 9/2013 | Wang | H04B 7/0417 | 375/267 |
| 8,559,294 B2* | 10/2013 | Vook | H04B 7/0452 | 370/203 |
| 8,599,980 B2* | 12/2013 | Ko | H04L 27/2601 | 342/350 |
| 8,605,658 B2 | 12/2013 | Fujimoto | | |
| 8,908,494 B2* | 12/2014 | Han | H04J 13/10 | 370/210 |
| 8,923,785 B2* | 12/2014 | Howard | H04B 7/0417 | 375/267 |
| RE45,528 E* | 5/2015 | Sawai | | 375/267 |
| 9,107,216 B2* | 8/2015 | Nakasato | H04W 72/0453 | |
| 9,130,696 B2* | 9/2015 | Catreux-Erceg | H04B 7/0615 | |
| 9,184,820 B2* | 11/2015 | Raleigh | H04B 7/0615 | |
| 9,379,793 B2* | 6/2016 | Inoue | H04B 7/0456 | |
| 2002/0080743 A1* | 6/2002 | Morita | H04B 1/707 | 370/335 |
| 2004/0192218 A1* | 9/2004 | Oprea | H04L 25/03343 | 455/73 |
| 2005/0117660 A1* | 6/2005 | Vialle | H04B 1/7115 | 375/299 |
| 2006/0262874 A1* | 11/2006 | Shan | H01Q 3/26 | 375/267 |
| 2007/0072646 A1* | 3/2007 | Kuwahara | H04W 88/085 | 455/561 |
| 2007/0189148 A1* | 8/2007 | Garmonov | H04B 1/7097 | 370/204 |
| 2007/0206686 A1* | 9/2007 | Vook | H04B 7/0671 | 375/260 |
| 2007/0211815 A1* | 9/2007 | Pan | H04B 7/0689 | 375/267 |
| 2007/0243831 A1* | 10/2007 | Seki | H04B 7/0408 | 455/69 |
| 2009/0010355 A1* | 1/2009 | Mori | H04B 7/0615 | 375/267 |
| 2009/0161749 A1* | 6/2009 | Nangia | H04L 5/0007 | 375/233 |
| 2009/0201214 A1 | 8/2009 | Falk | | |
| 2009/0213969 A1* | 8/2009 | Hasegawa | H04L 25/03012 | 375/343 |
| 2009/0258609 A1* | 10/2009 | Miyoshi | H04B 7/0413 | 455/101 |
| 2009/0268835 A1* | 10/2009 | Imai | H04B 7/0626 | 375/267 |
| 2010/0020895 A1* | 1/2010 | Jiang | H04L 27/2623 | 375/295 |
| 2010/0130221 A1* | 5/2010 | Imamura | H04B 7/0842 | 455/452.1 |
| 2010/0234071 A1* | 9/2010 | Shabtay | H04B 7/0408 | 455/562.1 |
| 2010/0322349 A1* | 12/2010 | Lee | H04L 27/2602 | 375/299 |
| 2011/0105063 A1 | 5/2011 | Yamamoto | | |
| 2011/0216725 A1* | 9/2011 | Miki | H04B 1/7143 | 370/329 |
| 2011/0268033 A1 | 11/2011 | Boldi et al. | | |
| 2011/0275376 A1 | 11/2011 | Boldi et al. | | |
| 2012/0098702 A1 | 4/2012 | Falk | | |
| 2012/0183090 A1* | 7/2012 | Sahara | H04B 7/0413 | 375/267 |
| 2013/0034066 A1* | 2/2013 | Kakishima | H04L 27/2613 | 370/329 |
| 2013/0039401 A1* | 2/2013 | Han | H04B 7/0617 | 375/222 |
| 2013/0076566 A1* | 3/2013 | Jiang | H01Q 1/246 | 342/373 |
| 2013/0157667 A1* | 6/2013 | Nakamura | H04L 5/0048 | 455/440 |
| 2013/0222182 A1* | 8/2013 | Nakasato | H04L 27/2613 | 342/368 |
| 2013/0244604 A1* | 9/2013 | Yellin | H04W 24/02 | 455/226.2 |
| 2014/0219378 A1* | 8/2014 | Yamaura | H04B 7/0421 | 375/267 |
| 2015/0124713 A1* | 5/2015 | Salhov | H01Q 3/2605 | 370/329 |
| 2015/0207549 A1* | 7/2015 | Nagata | H04L 27/2692 | 370/252 |
| 2016/0095100 A1* | 3/2016 | Yang | H04W 72/042 | 370/330 |
| 2016/0112089 A9* | 4/2016 | Zhang | H04L 5/026 | 375/146 |
| 2016/0173176 A1* | 6/2016 | Mizusawa | H04B 7/0456 | 375/267 |

FOREIGN PATENT DOCUMENTS

| | | |
|---|---|---|
| JP | 2009-188999 A | 8/2009 |
| JP | 2010-010966 A | 1/2010 |
| JP | 2010-183566 A | 8/2010 |
| WO | 2009/157146 A1 | 12/2009 |

OTHER PUBLICATIONS

Written Opinion of the International Searching Authority issued in PCT/JP2014/076382 mailed on Nov. 4, 2014 (4 pages).

(56) References Cited

OTHER PUBLICATIONS

Miyamoto, K. et al.; "Proposal of an optical transmission system in future mobile fronthaul"; The Institute of Electronics, Information and Communication Engineers, Sep. 2013, p. 182 (1 page).
Lorca, J. et al.; "Lossless Compression Technique for the Fronthaul of LTE/LTE-Advanced Cloud-RAN Architectures"; World of Wireless, Mobile and Multimedia Networks (WoWMoM), 2013 IEEE 14th International Symposium and Workshops, Jun. 7, 2013 (9 pages).
3GPP TS 36.300 V11.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).
Extended European Search Report issued in corresponding European Application No. 14852775.7, mailed Apr. 5, 2017 (9 pages).

* cited by examiner

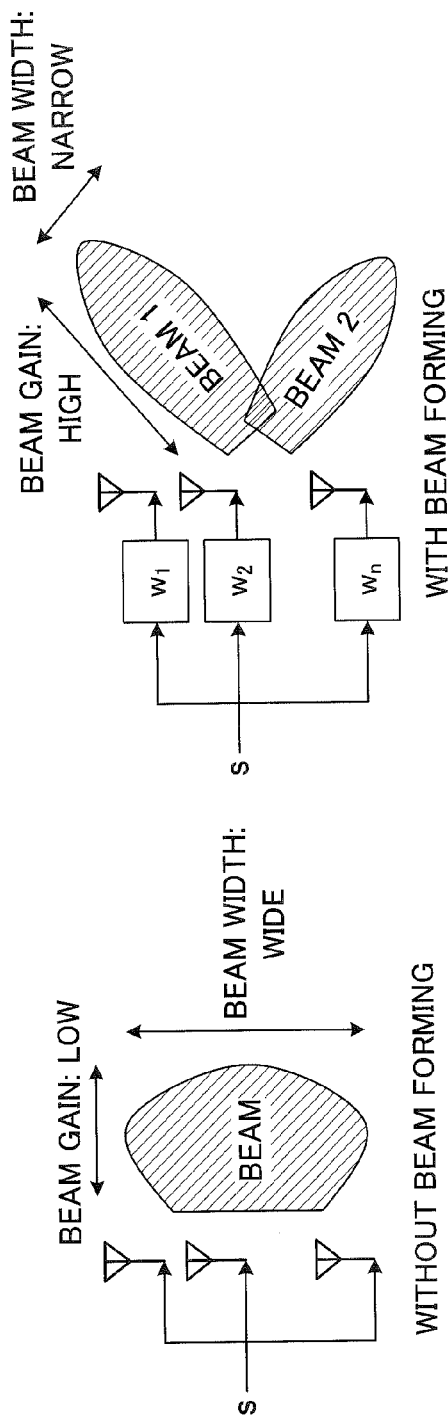
FIG.2B
FIG.2A
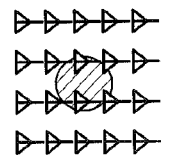
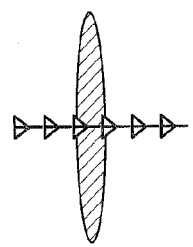
FIG.2C

RADIO APPARATUS, RADIO CONTROL APPARATUS AND COMMUNICATION CONTROL METHOD

TECHNICAL FIELD

The present invention relates to a radio apparatus, radio control apparatus and communication control method in the next-generation mobile communication system.

BACKGROUND ART

In LTE (Long Term Evolution) is studied a base station system for separating and installing a radio control apparatus (for example, BBU: BaseBand Unit) for performing baseband processing and the like, and a radio apparatus (for example, RAU: Radio Antenna Unit) for transmitting and receiving radio signals with an antenna (for example, Non-patent Document 1).

In this base station system, the radio control apparatus (BBU) and radio apparatus (RAU) are connected with an optical transmission path (optical cable). More specifically, a signal from the radio control apparatus (BBU) is optically transmitted to the radio apparatus (RAU) via an interface such as a CPRI (Common Public Radio Interface). The radio apparatus (RAU) converts the signal from the radio control apparatus (BBU) into a signal with a radio frequency (RF: Radio Frequency) to transmit from the antenna. The radio apparatus is also called the optical feeder radio apparatus.

CITATION LIST

Non-Patent Literature

Non-patent Literature 1: 3GPP TS 36.300 "Evolved UTRA and Evolved UTRAN Overall description"

SUMMARY OF INVENTION

Technical Problem

In the above-mentioned base station system, it is assumed that the radio apparatus (RAU) is provided with a plurality of antenna elements to perform MIMO (Multiple Input Multiple Output) transmission. In such a case, there is the risk that a transmission amount increases in an optical transmission path between the radio apparatus (RAU) and the radio control apparatus (BBU) and that a bandwidth required for the optical transmission path increases. Particularly, in the case where the radio apparatus (RAU) performs MIMO transmission (hereinafter, referred to as Massive-MIMO) using large amounts of antenna elements in a high-frequency band, it is expected that the bandwidth required for the optical transmission path significantly increases.

The present invention was made in view of such a respect, and it is an object of the invention to provide a radio apparatus, radio control apparatus and communication control method for enabling the bandwidth required for the optical transmission path to be reduced in a base station system including the radio apparatus that performs MIMO transmission using a plurality of antenna elements and the radio control apparatus.

Solution to Problem

A communication control method of the present invention is a communication control method in a base station system including a radio apparatus provided with a plurality of antenna elements and a radio control apparatus connected to the radio apparatus with an optical transmission path, and includes the step of transmitting antenna weight coefficient information indicative of antenna weight coefficients of the plurality of antenna elements and a transmission signal in the radio control apparatus, in the radio apparatus the step of multiplying the transmission signal by each of the antenna weight coefficients to generate weighted signals of the plurality of antenna elements, and the step of transmitting the weighted signals from the plurality of antenna elements.

Advantageous Effects of Invention

According to the present invention, in the base station system including the radio apparatus that performs MIMO transmission using a plurality of antenna elements and the radio control apparatus, it is possible to reduce a bandwidth required for the optical transmission path between the radio apparatus and the radio control apparatus.

BRIEF DESCRIPTION OF DRAWINGS

FIG. 2 contains explanatory diagrams of beam forming;

DESCRIPTION OF EMBODIMENTS

Figure 1B:
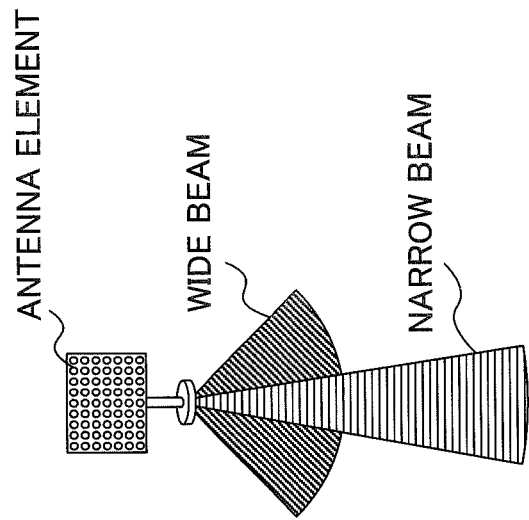
FIG. 1 contains explanatory diagrams of Massive-MIMO transmission.
Figure 1A:
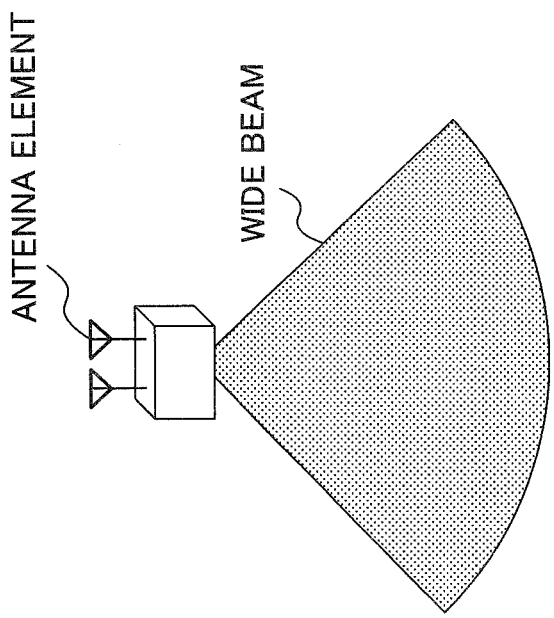

FIG. 1 contains explanatory diagrams of Massive-MIMO. FIG. 1A illustrates MIMO transmission using a small number of antenna elements, and FIG. 1B illustrates MIMO transmission using a large number of antenna elements. Further, FIG. 1A illustrates an arrival range of a transmission beam in a low-frequency band, and FIG. 1B illustrates an arrival range of a transmission beam in a high-frequency band.

As shown in FIG. 1B, in Massive-MIMO transmission, a data rate (frequency usage efficiency) is increased by transmitting data using a large number (for example, 100 or more) of antenna elements. Since data is transmitted using a large number of antenna elements, it is possible to improve transmission efficiency associated with multiplexing as compared with the case (for example, FIG. 1A) of using a small number of antenna elements, and it is possible to perform radio communication at higher speed than conventional communication. Further, sophisticated beam forming is made possible by combinations of a large number of antenna elements. By such sophisticated beam forming, effects are expected such as increases in received signal power by beam forming gain, reduction in interference, effective use of radio resources and the like.

Further, Massive-MIMO transmission is capable of being used in a high-frequency band (for example, 10 GHz or more). Generally, the size of the antenna element is a size proportional to a wavelength of a transmission signal. In a high-frequency band, the wavelength of the transmission signal is relatively short, and it is possible to reduce the size of the antennal element. Therefore, the high-frequency band is preferable for the Massive-MIMO transmission scheme provided with a large number of antenna elements. Further, in the high-frequency band, the utilization rate is relatively low as compared with a low-frequency band, and it is easier to secure resources with a wide bandwidth.

On the other hand, propagation loss increases in the high-frequency band. Therefore, in the case of using the same transmission power, received signal intensity in a user terminal decreases as compared with the low-frequency band. Then, in the high-frequency band, as shown in FIG. 1, it is studied to cover a decrease in received signal intensity by beam forming gain.

As shown in FIG. 1A, in the low-frequency band, also in the case of forming a beam (wide beam) with a wide beam width using a small number of antenna elements, the wide beam arrives at a long distance. On the other hand, as shown in FIG. 1B, in the high-frequency band, the wide beam does not arrive at a long distance unlike the low-frequency band. Therefore, in the high-frequency band, by forming a beam (narrow beam) with a narrow beam width using a large number of antennal elements (i.e. by performing Massive-MIMO transmission), the narrow beam is caused to arrive at a long distance. By beam forming gain of the narrow beam, it is possible to prevent the received signal intensity of a user terminal from decreasing in the high-frequency band.

FIG. 2 contains explanatory diagrams of beam forming. Beam forming (BF) is a technique of providing the transmission beam with directivity by controlling amplitude and phases of respective transmission signals in a plurality of antenna elements. In the case of performing beam forming (FIG. 2B), as compared with the case of not performing beam forming (FIG. 2A), it is possible to narrow the beam width, and to obtain high gain (beam gain).

In this beam forming, generally, as the number of antenna elements increases, it is possible to perform more sophisticated control. This is because it is possible to control the number of beams, the shape of each beam (width of the beam in a horizontal plane, width of the beam in a vertical plane, etc.) and the direction and gain of the beam in detail, corresponding to the number of antenna elements. As shown in FIG. 2C, the beam is formed by controlling weights multiplied by each of antenna elements arranged in the vertical direction, and each of antenna elements arranged in the horizontal plane. In addition, FIG. 2C is a front diagram of the beam.

Figure 3:
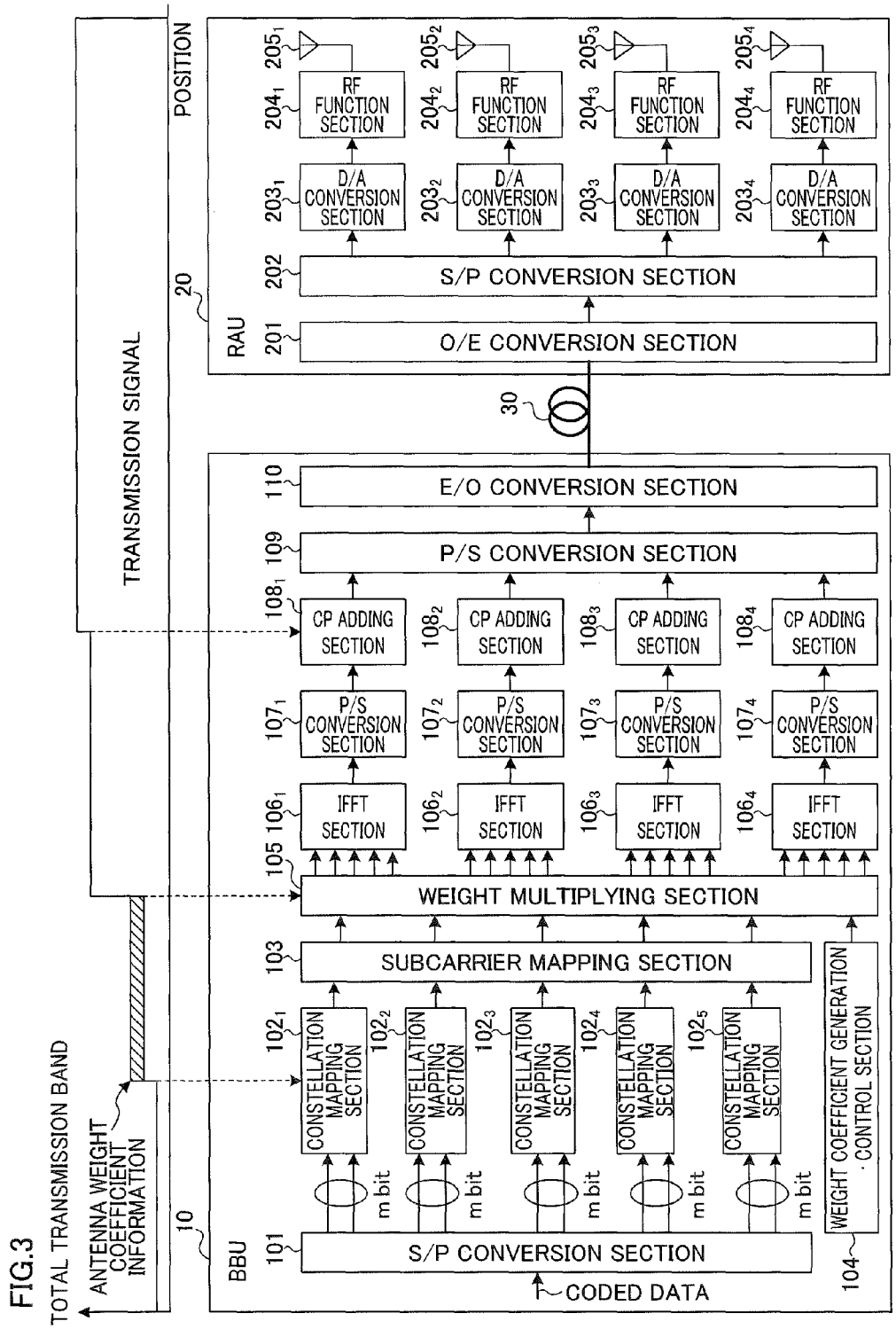
FIG. 3 is an explanatory diagram of one example of a base station system.

Referring to FIG. 3, described is one example of a base station system for performing MIMO transmission. FIG. 3 is an explanatory diagram of one example of the base station system. As shown in FIG. 3, the base station system includes a BBU 10, RAU 20 and optical transmission path (optical cable) 30 for connecting between the BBU 10 and the RAU 20. In addition, although not shown, the base station system may include a plurality of BBUs 10 and a plurality of RAUs 20.

The BBU 10 is provided with a serial/parallel (S/P) conversion section 101, constellation mapping sections 102 for each subcarrier, subcarrier mapping section 103, weight coefficient generation control section 104, weight multiplying section 105, IFFT sections 106, parallel/serial (P/S) conversion sections 107 and cyclic prefix (CP) adding sections 108 for each antenna element 205 of the RAU 20, parallel/serial (P/S) conversion section 109, and electric/optical (E/O) conversion section 110.

The S/P conversion section 101 converts coded data into n items of parallel data so as to divide and transmit with n subcarriers. In addition, FIG. 3 illustrates the case of dividing and transmitting coded data with four subcarriers (i.e. the case of n=5), but the present invention is not limited thereto. Further, the S/P conversion section 101 converts parallel data for each subcarrier into 2-data sequence (m bits) for an in-phase component (I channel) and a quadrature component (Q channel) to output to the constellation mapping sections 102 for each subcarrier.

Each of the constellation mapping sections 102 maps the data sequence input from the S/P conversion section 101 to the I/Q plane using various types of modulation schemes. In addition, as the modulation schemes, for example, it is possible to use BPSK (Binary Phase Shift Keying), QPSK (Quadrature Phase Shift Keying), 8PSK (8 Phase Shift Keying), 16QAM (16 Quadrature Amplitude Modulation), 64QAM (64 Quadrature Amplitude Modulation) and the like.

The subcarrier mapping section 103 maps the information (symbols), which is mapped to the I/Q plane in each of the constellation mapping sections 102, to subcarriers. Further, the subcarrier mapping section 103 outputs n (n=5, in FIG. 3) frequency-domain signals subjected to subcarrier mapping to the weight multiplying section 105.

The weight coefficient generation • control section 104 generates antenna weight coefficients of a plurality of antenna elements 205 for each subcarrier to output to the weight multiplying section 105. The antenna weight coefficients are generated for each of the antenna elements 205 and for each of the subcarriers.

The weight multiplying section 105 distributes n frequency-domain signals, which are input from the subcarrier mapping section 103, to each of a plurality of antenna elements 205 of the RAU 20. The weight multiplying section 105 multiplies n frequency-domain signals distributed to each antennal element 205 by an antenna weight coefficient to perform weighting. The weight multiplying section 105 outputs n frequency-domain signals weighted for each subcarrier to each of the IFFT sections 106.

The IFFT sections 106 are provided corresponding to the antenna elements 205 of the RAU 20, respectively. In addition, FIG. 3 illustrates the case (i.e. the case where the number $N_T$ of antenna elements=4) where the RAU 20 has four (transmission) antennal elements 205, but the present invention is not limited thereto. The numbers of the IFFT sections 106, P/S conversion sections 107 and CP adding sections 108 are capable of being increased or decreased corresponding to the number of antenna elements 205.

Each of the IFFT sections 106 performs Inverse Fast Fourier Transform on each of n frequency-domain signals input from the weight multiplying section 105 to generate n time-domain signals. Each of the IFFT sections 106 outputs n generated time-domain signals to the corresponding P/S conversion section 107. In addition, Inverse Discrete Fourier Transform (IDFT) may be performed, as a substitute for Inverse Fast Fourier Transform.

Each of the P/S conversion sections 107 converts n parallel time-domain signals input from the corresponding IFFT section 106 into a serial time-domain signal to output to the corresponding CP adding section 108. Each of the CP adding sections 108 adds a cyclic prefix (guard interval) to the time-domain signal input from the corresponding P/S conversion section 107 to output to the P/S conversion section 109. The P/S conversion section 109 converts $N_T$ ($N_T$=4, in FIG. 3) parallel time-domain signals into a serial time-domain signal to output to the electric/optical (E/O) conversion section 110, where $N_T$ is the number of antenna elements.

The E/O conversion section 110 converts the time-domain signal input from the P/S conversion section 109 from the electric signal into an optical signal. The E/O conversion section 110 transmits the converted optical signal to the RAU 20 via the optical transmission path 30.

The RAU 20 is provided with an optical/electric (O/E) conversion section 201, serial/parallel (S/P) conversion section 202, digital/analog (D/A) conversion sections 203 for each of the antenna elements 205, radio frequency (RF) function sections 204 for each of the antenna elements 205, and a plurality of antenna elements 205.

The O/E conversion section 201 converts the optical signal, which is transmitted from the BBU 10 via the optical transmission path 30, into an electric signal. The O/E conversion section 201 outputs a serial time-domain signal corresponding to $N_T$ antenna elements 205 to the S/P conversion section 202.

The S/P conversion section 202 converts the serial time-domain signal corresponding to $N_T$ ($N_T$=4, in FIG. 3) antenna elements 205 into $N_T$ parallel time-domain signals. The S/P conversion section 202 outputs the time-domain signal for each of the antenna elements 205 to the corresponding D/A conversion section 203.

Each of the D/A conversion sections 203 converts the time-domain signal input from the S/P conversion section 202 from the digital signal into an analog signal to output to the corresponding RF function section 204. Each of the RF function sections 204 converts the input signal from the corresponding D/A conversion section 203 into a signal with a radio-frequency (RF) band to transmit from the corresponding antenna element 205.

In the base station system as shown in FIG. 3, the weight multiplying section 105 of the BBU 10 multiplies each of n (n=5, in FIG. 3) frequency-domain signals by respective antenna weight coefficients of $N_T$ ($N_T$=4, in FIG. 3) antenna elements 205 to generate n*$N_T$ weighted signals. Therefore, the bandwidth required for the optical transmission path between the BBU 10 and the RAU 20 increases in proportion to the number $N_T$ of antenna elements.

In the base station system thus including the RAU 20 for performing MIMO transmission using a plurality of antenna elements 205 and the BBU 10, there is the problem that the bandwidth required for the optical transmission path between the BBU 10 and the RAU 20 increases. Further, in the base station system as shown in FIG. 3, it is also assumed to perform the above-mentioned Massive-MIMO transmission by providing the RAU 20 with 100 or more antenna elements 205. In the case of performing this Massive-MIMO transmission, it is expected that the bandwidth required for the optical transmission path significantly increases in proportional to the number $N_T$ of antenna elements.

Therefore, the inventors of the present invention studied communication control methods for enabling the bandwidth required for an optical transmission path between a radio apparatus (for example, RAU) and a radio control apparatus (for example, BBU) to be reduced in the case of performing MIMO transmission, in a base station system including the radio apparatus provided with a plurality of antenna elements and the radio control apparatus connected to the radio apparatus with the optical transmission path, and arrived at the invention.

In a communication control method of the present invention, the radio control apparatus transmits antenna weight coefficient information indicative of antenna weight coefficients of a plurality of antenna elements and a transmission signal in an optical transmission path. The radio apparatus multiplies the transmission signal by each of the antenna weight coefficients to generate weighted signals of the plurality of antenna elements, and transmits the weighted signals from the plurality of antenna elements.

According to the communication control method of the invention, the radio apparatus performs multiplication of the antenna weight coefficients, and therefore, the radio control apparatus does not need to transmit n*NT weighted signals (n=the number of subcarriers, $N_T$=the number of antenna elements) to the radio apparatus via the optical transmission path. Therefore, it is possible to reduce a transmission amount of the optical transmission path and reduce the bandwidth required for the optical transmission path.

In addition, the communication control method of the invention is used in a base station system including a radio apparatus provided with a plurality of antenna elements and a radio control apparatus connected to the radio apparatus with an optical transmission path. In this base station system, the radio apparatus may use a small number (for example, 2 to 8 or the like) of antenna elements to perform MIMO transmission, or may use a large number (for example, 100 or more) of antenna elements to perform Massive-MIMO transmission.

Further, a transmission signal from the radio control apparatus to the radio apparatus may be a time-domain signal subsequent to addition of cyclic prefix (Embodiment 1), a time-domain signal prior to addition of cyclic prefix (Embodiment 2), a mapping signal mapped onto the I/Q plane (Embodiment 3), or a coded data signal (Embodiment 4).

Further, the antenna weight coefficients indicated by the antenna weight coefficient information may be for each antenna element (Embodiments 1 and 2), or may be for each antenna element and for each subcarrier (Embodiments 3 and 4).

The base station systems according to the Embodiments will specifically be described below. In addition, the case will be described below where the radio control apparatus and radio apparatus included in the base station system according to the Embodiment are respectively the BBU and RAU, but the invention is not limited thereto. The radio control apparatus may be BDE (Base station Digital processing Equipment), REC (Radio Equipment Control) and the like. Further, the radio apparatus may be RRE (Remote Radio Equipment), RRH (Remote Radio Head), RE (Radio Equipment) and the like.

(Embodiment 1)

Figure 4:
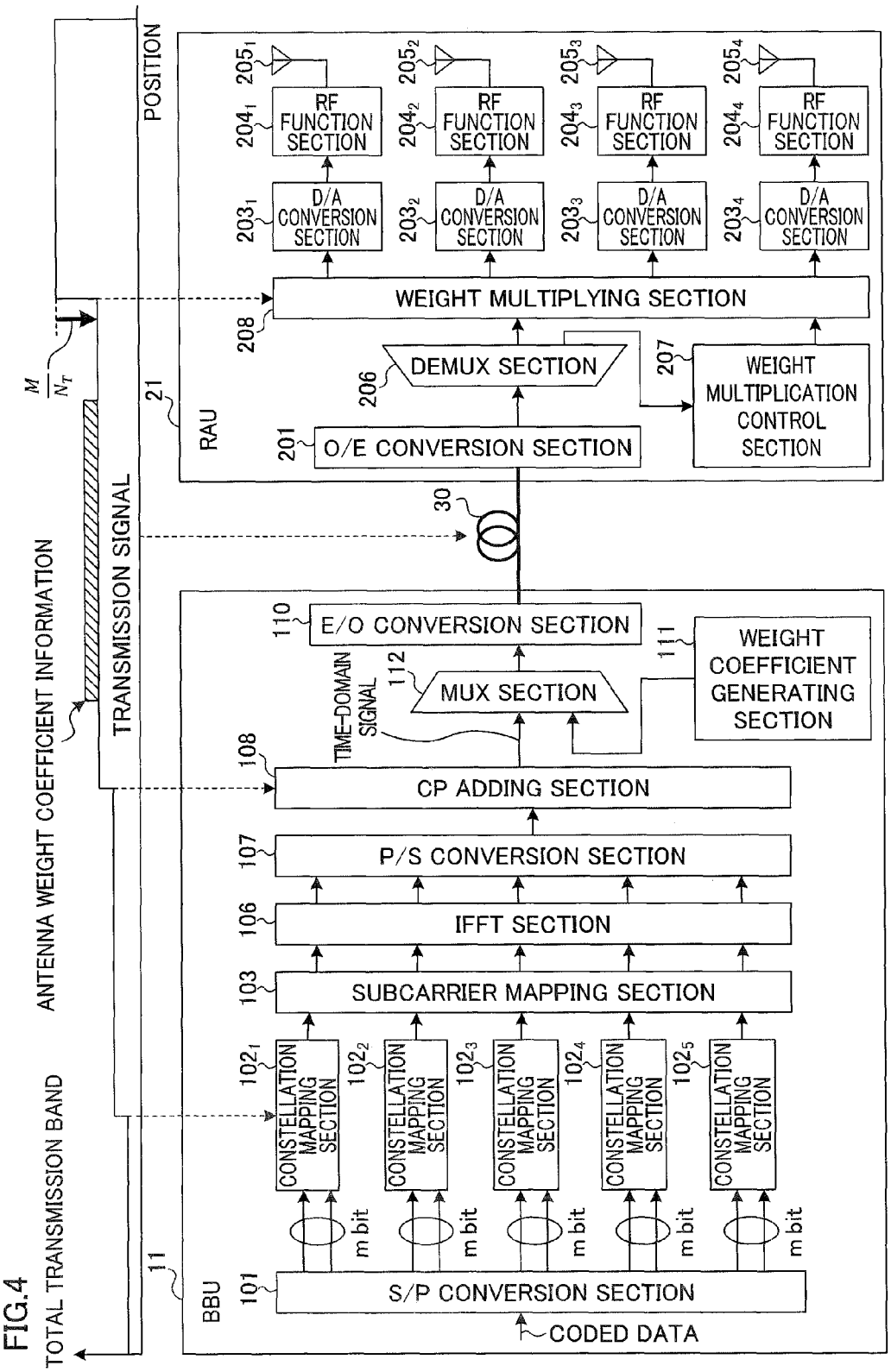
FIG. 4 is an explanatory diagram of a base station system according to Embodiment 1.

The base station system according to Embodiment 1 will be described with reference to FIGS. 4 and 5. FIG. 4 is an explanatory diagram of the base station system according to Embodiment 1. As shown in FIG. 4, the base station system according to Embodiment 1 includes a BBU 11 (radio control apparatus), RAU 21 (radio apparatus) and optical transmission path 30 for connecting between the BBU 11 and the RAU 21. In addition, although not shown in the figure, the base station system may include a plurality of BBUs 11 and a plurality of RAUs 21.

In the base station system according to Embodiment 1, the BBU 11 transmits antenna weight coefficient information indicative of antenna weight coefficients of a plurality of antenna elements 205, and a time-domain transmission signal subsequent to addition of cyclic prefix to the RAU 21 in the optical transmission path 30.

Further, in the base station system according to Embodiment 1, the RAU 21 multiplies the time-domain signal subsequent to addition of cyclic prefix by each of the antenna weight coefficients of the plurality of antenna elements 205, and generates weighted signals of the plurality of antenna elements 205. The RAU 21 transmits the weighted signals from the plurality of antenna elements 205.

More specifically, the BBU 11 is provided with the S/P conversion section 101, constellation mapping sections 102 for each subcarrier, the subcarrier mapping section 103, a single IFFT section 106, a single P/S conversion section 107, a single CP adding section 108, the electric/optical (E/O) conversion section 110, a weight coefficient generating section 111, and a multiplexing (MUX) section 112.

As distinct from the BBU 10 in FIG. 3, the BBU 11 is not provided with the weight multiplying section 105. Therefore, the number of each of the IFFT section 106, P/S conversion section 107 and C/P adding section 108 is not the number $N_T$ of antenna elements, and is one. In FIG. 4, the S/P conversion section 101, constellation mapping sections 102 for each subcarrier and subcarrier mapping section 103 are the same as in FIG. 3, and therefore, descriptions thereof are omitted.

The IFFT section 106 performs Inverse Fast Fourier Transform on each of n (n=5, in FIG. 4) frequency-domain signals input from the subcarrier mapping section 103 to generate n time-domain signals, where n is the number of subcarriers. The IFFT section 106 outputs n generated time-domain signals to the P/S conversion section 107.

The P/S conversion section 107 converts n parallel time-domain signals input from the IFFT section 106 into a serial time-domain signal to output to the CP adding section 108. The CP adding section 108 adds a cyclic prefix (guard interval) to the time-domain signal input from the P/S conversion section 107 to output to the MUX section 112.

Figure 5B:
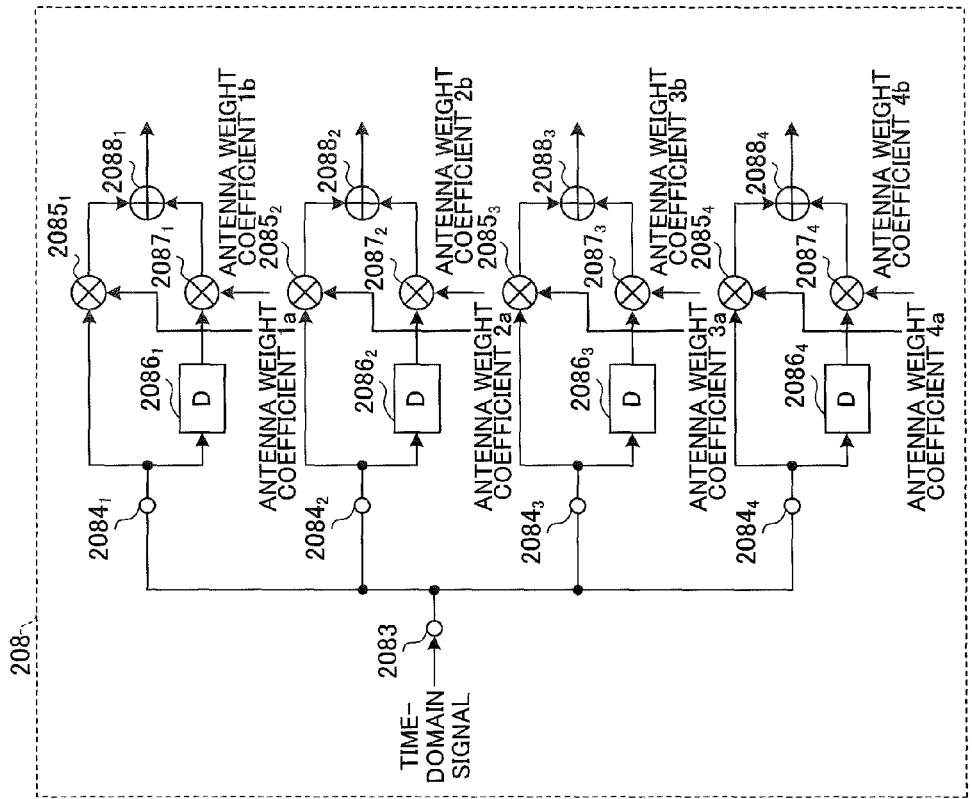
FIG. 5 contains configuration diagrams of a weight multiplying section according to Embodiment 1.

The weight coefficient generating section 111 generates antenna weight coefficients of a plurality of antenna elements 205, and outputs antenna weight coefficient information indicative of the antenna weight coefficients to the MUX section 112. In addition, the antenna weight coefficient of each of the antenna elements 205 may include a first antenna weight coefficient a and second antenna weight coefficient b (FIG. 5B described later).

The MUX section 112 multiplexes the time-domain signal input from the CP adding section 108 and the antenna weight coefficient information input from the weight coefficient generating section 111 to output to the E/O conversion section 110. For example, the MUX section 112 may multiplex the time-domain signal and the antenna weight coefficient information using an interface such as a CPRI. The E/O conversion section 110 converts the multiplexed signal from the MUX 112 from the electric signal into an optical signal. The E/O conversion section 110 transmits the converted optical signal to the RAU 20 via the optical transmission path 30.

In addition, the time-domain signal input from the CP adding section 108 and the antenna weight coefficient information input from the weight coefficient generating section 111 may be mapped to different channels and output to the E/O conversion section 110, without being multiplexed. For example, the time-domain signal input from the CP adding section 108 may be mapped to a data channel of the CPRI, while the antenna weight coefficient information may be mapped to a control channel of the CPRI.

The RAU 21 is provided with the O/E conversion section 201, digital/analog (D/A) conversion sections 203 and radio frequency (RF) function sections 204 for each of antenna elements 205, a plurality of antenna elements 205, demultiplexing (DEMUX) section 206, weight multiplication control section 207, and weight multiplying section 208 (multiplying section). Thus, as distinct from the RAU 20 in FIG. 3, the RAU 21 is provided with the DEMUX section 206, weight multiplication control section 207 and weight multiplying section 208.

As shown in FIG. 4, the DEMUX section 206 demultiplexes the input signal from the O/E conversion section 201 into the time-domain signal and the antenna weight coefficient information. The DEMUX section 206 outputs the time-domain signal to the weight multiplying section 208, and outputs the antenna weight coefficient information to the weight multiplication control section 207.

The weight multiplication control section 207 controls the weight multiplying section 208, based on the antenna weight coefficients of a plurality of antenna elements 205 indicated by the antenna weight coefficient information.

The weight multiplying section 208 distributes the time-domain signal input from the DEMUX section 206 to each of a plurality of antenna elements 205 of the RAU 21. The weight multiplying section 208 multiplies the time-domain signal distributed to each antenna element 205 by the antenna weight coefficient to perform weighting. The weight multiplying section 208 outputs $N_T$ ($N_T$=4, in FIG. 3) weighted signals to corresponding D/A conversion sections 203, respectively.

Figure 5A:
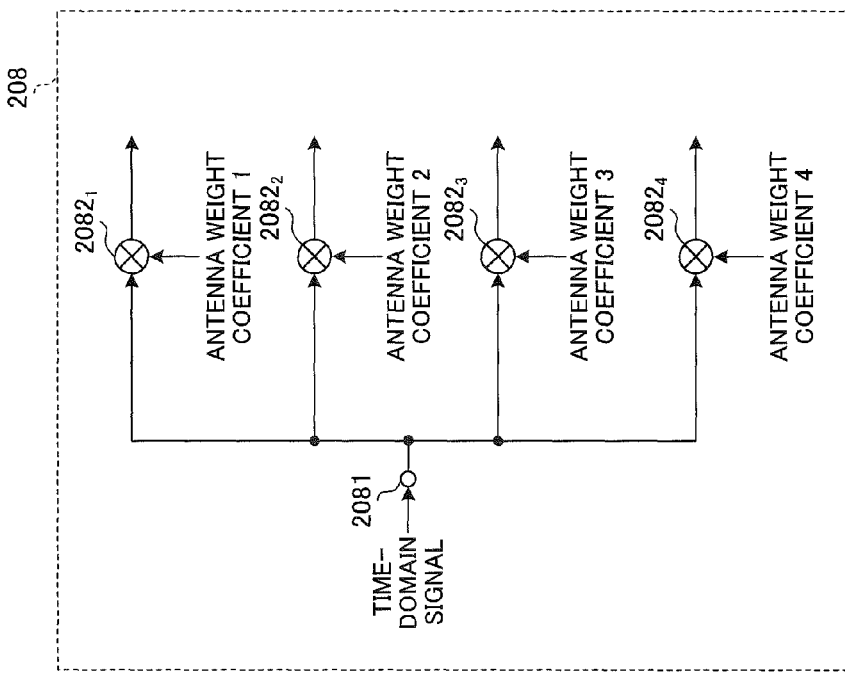

Herein, a detailed configuration of the weight multiplying section 208 will be described with reference to FIG. 5. FIG. 5 contains configuration diagrams of the weight multiplying section according to Embodiment 1. FIG. 5A describes a configuration example in the case where it is not possible to adjust antenna weight coefficients for each subcarrier. In such a case, the weight multiplying section 208 is provided with a terminal 2081, and $N_T$ ($N_T$=4, in FIG. 5A) multipliers 2082 where $N_T$ is the number of antenna elements.

In FIG. 5A, the time-domain signal from the BBU 11 is distributed to each of the multipliers 2082 in the terminal 2081. Each of the multipliers 2082 multiplies the distributed time-domain signal by the antenna weight coefficient of the corresponding antenna element 205 to perform weighting. Each of the multipliers 2082 outputs the weighted signal. In FIG. 5A, since it is not possible to multiply by the antenna weight coefficient for each subcarrier, there is the risk that beam forming gain degrades.

On the other hand, FIG. 5B describes a configuration example in the case where it is possible to adjust antenna weight coefficients for each subcarrier. In such a case, the weight multiplying section 208 is provided with a terminal 2083, $N_T$ ($N_T$=4, in FIG. 5B) terminals 2084, $N_T$ multipliers 2085, $N_T$ delay circuits 2086, $N_T$ multipliers 2087, and $N_T$ adders 2088, where $N_T$ is the number of antenna elements.

In FIG. 5B, the time-domain signal from the BBU 11 is distributed to each of the terminals 2084 in the terminal 2083. Each of the terminals 2084 further distributes the distributed time-domain signal to the corresponding multiplier 2085 and delay circuit 2086. Each of the multipliers 2085 multiplies the distributed time-domain signal by a first antenna weight coefficient a to output the weighted signal. On the other hand, each of the delay circuits 2086 delays the distributed time-domain signal by a predetermined time, and then, multiplies the signal by a second antenna weight coefficient b to output the weighted signal. Each of the adders 2088 outputs the weighted signal output from the corresponding multipliers 2085 and 2087.

Thus, in FIG. 5B, the multiplication result of the time-domain signal by the first antenna weight a and the multiplication result of the delay signal of the time-domain signal by the second antenna weight coefficient b are added to generate weighted signals of a plurality of antenna elements 205. By thus adding a plurality of paths, it is made possible to multiply different weights for each frequency. This is the same principle occurring in receiving a plurality of signals from multi-path transmission paths in frequency selective fading. Therefore, it is possible to obtain the same effect as in the case of multiplying antenna weight coefficients for each subcarrier.

Each of the D/A conversion sections 203 converts the weighted signal output from the above-mentioned weight multiplying section 208 from the digital signal into an analog signal to output to the corresponding RF function section 204. Each of the RF function sections 204 converts the input signal from the corresponding D/A conversion section 203 into a signal with a radio-frequency (RF) band to transmit from the corresponding antenna element 205.

As described above, in the base station system according to Embodiment 1, since the RAU 21 performs multiplication of antenna weight coefficients, the BBU 11 does not need to transmit n*NT weighted signals (n=the number of subcarriers, NT=the number of antenna elements) via the optical transmission path 30. Therefore, it is possible to reduce the transmission amount of the optical transmission path 30, and it is possible to reduce the bandwidth required for the optical transmission path 30.

More specifically, in the optical transmission path 30, as shown in FIG. 4, it is essential only that it is possible to transmit the time-domain signal corresponding to n frequency-domain signals where n is the number of subcarriers, the cyclic prefix, and the antenna weight coefficient information indicative of $N_T$ antenna weight coefficients where $N_T$ is the number of antenna elements. Therefore, the bandwidth required for the optical transmission path 30 in FIG. 4 is $M/N_T$, as compared with the case of transmitting $n*N_T$ time-domain signals (weighted signals) (n=the number of subcarriers, $N_T$=the number of antenna elements) as shown in FIG. 3. In addition, in FIG. 4, since the number M of streams=1, the bandwidth required for the optical transmission path 30 is $1/N_T$.

(Modification)

Figure 6:
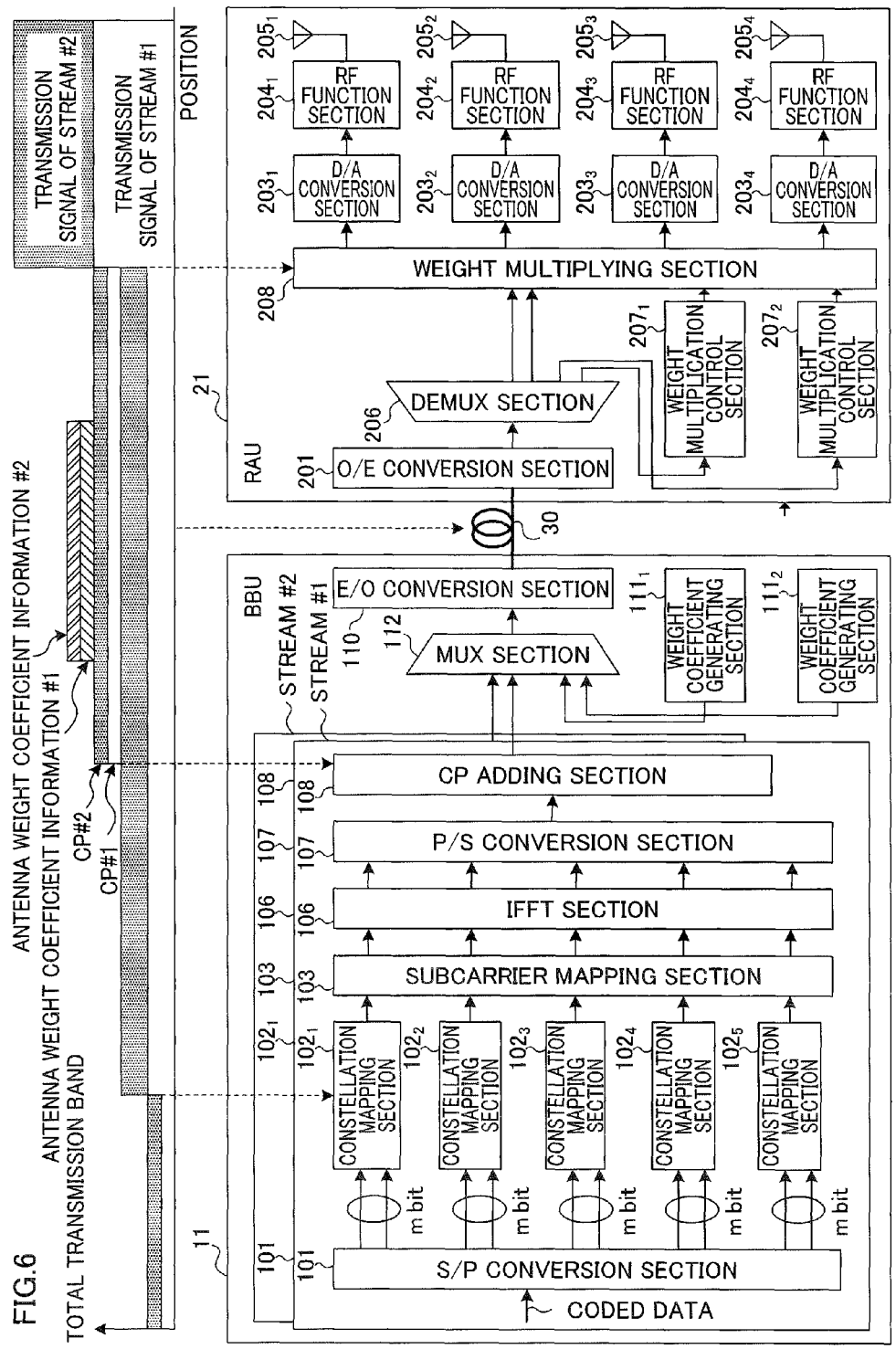
FIG. 6 is an explanatory diagram of a base station system according to Modification of Embodiment 1.

Referring to FIG. 6, described next is a Modification of the base station system according to Embodiment 1. FIG. 6 is an explanatory diagram of the base station system according to the Modification of Embodiment 1. FIG. 4 describes the base station system for performing MIMO transmission on a transmission signal of a single stream, and FIG. 6 describes the base station system for performing MIMO transmission on transmission signals of a plurality of streams. In addition, in FIG. 6, the number M of streams is assumed to be "2", but the invention is not limited thereto. The following description will be given with emphasis on differences from FIG. 4.

In the base station system according to the Modification of Embodiment 1, as shown in FIG. 6, the BBU 11 is provided, for each stream, with S/P conversion sections 101, constellation mapping sections 102 for each subcarrier, subcarrier mapping sections 103, IFFT sections 106, P/S conversion sections 107, CP adding sections 108, and weight coefficient generating sections 111, and in this respect, the system is different from the base station system as shown in FIG. 4.

The weight coefficient generating section 111 of each stream generates antenna weight coefficients of a plurality of antenna elements 205, and outputs antenna weight coefficient information indicative of the antenna weight coefficients to the MUX section 112. Thus, the antenna weight coefficient information is generated for each stream.

The MUX section 112 multiplexes the time-domain signal input from the CP adding section 108 of each stream, and the antenna weight coefficient information input from the weight coefficient generating section 111 of each stream, and outputs the resultant to the E/O conversion section 110. In addition, the antenna weight coefficient information of each stream may be mapped to a control channel of the CPRI and transmitted, without being multiplexed with the time-domain signal of each stream.

Further, in the base station system according to the Modification, the RAU 21 is provided with weight multiplication control sections 207 for each stream, and in this respect, the system is different from the base station system as shown in FIG. 4. The DEMUX 206 demultiplexes the input signal from the O/E conversion section 201 into time-domain signals and antenna weight coefficient information for each stream. The DEMUX section 206 outputs the time-domain signals for each stream to the weight multiplying section 208, and outputs the antenna weight coefficient information of each stream to the corresponding weight multiplication control section 207.

The weight multiplication control section 207 of each stream controls the weight multiplying section 208 based on the antenna weight coefficient information of each stream.

The weight multiplying section 208 multiplies the time-domain signal by the antenna weight coefficient for each stream, and generates weighted signals of a plurality of antenna elements 205 for each stream. More specifically, the weight multiplying section 208 distributes the time-domain signal of each stream to each of a plurality of antenna elements 205 of the RAU 21. The weight multiplying section 208 multiplies the time-domain signal of each stream distributed to each antenna element 205 by the antenna weight coefficient to perform weighting. The weight multiplying section 208 outputs $N_T$ weighted signals to the corresponding D/A sections 203 for each stream, respectively.

As described above, in the base station system according to the Modification of Embodiment 1, since the RAU 21 performs multiplication of antenna weight coefficients, also in the case of performing MIMO transmission on transmission signals of a plurality of streams, it is possible to reduce the transmission amount of the optical transmission path 30, and it is possible to reduce the bandwidth required for the optical transmission path 30.

More specifically, in the optical transmission path 30, as shown in FIG. 6, it is essential only that it is possible to transmit the time-domain signal corresponding to n frequency-domain signals of each stream where n is the number of subcarriers, the cyclic prefix of each stream, and the antenna weight coefficient information indicative of $N_T$ antenna weight coefficients of each stream where $N_T$ is the number of antenna elements. Therefore, the bandwidth required for the optical transmission path 30 in FIG. 6 is $M/N_T$ (M=2, in FIG. 6), as compared with the case of transmitting the number M of streams x the number n of subcarriers x the number $N_T$ of antenna elements $M*n*N_T$ time-domain signals (weighted signals)(M=the number of streams, n=the number of subcarriers, $N_T$=the number of antenna elements).

(Embodiment 2)

Figure 7:
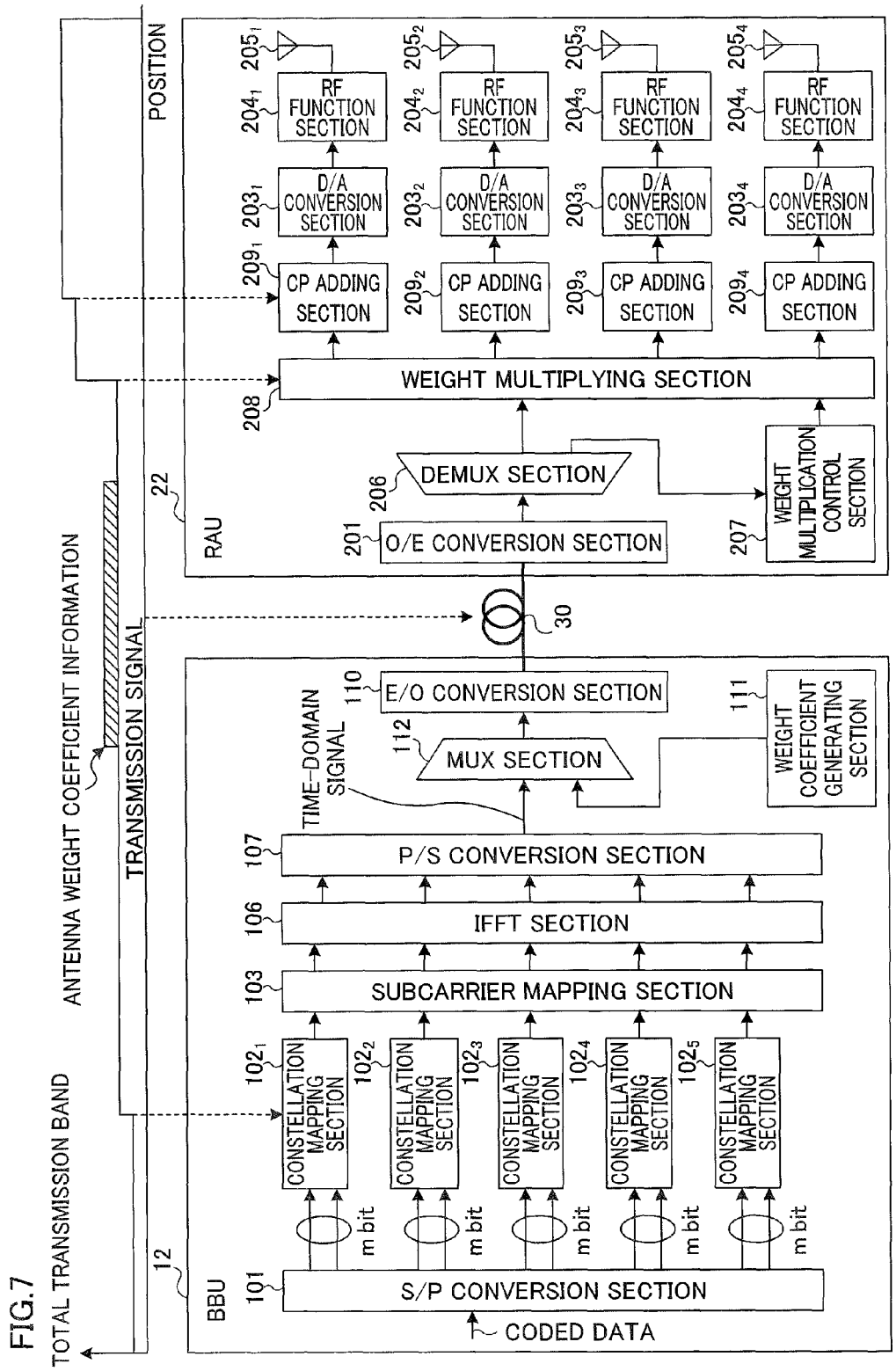
FIG. 7 is an explanatory diagram of a base station system according to Embodiment 2.

The base station system according to Embodiment 2 will be described with reference to FIG. 7. FIG. 7 is an explanatory diagram of the base station system according to Embodiment 2. As shown in FIG. 7, the base station system according to Embodiment 2 includes a BBU 12 (radio control apparatus), RAU 22 (radio apparatus) and optical transmission path 30 for connecting between the BBU 12 and the RAU 22. In addition, although not shown in the figure, the base station system may include a plurality of BBUs 12 and a plurality of RAUs 22. The following description will be given with emphasis on differences from the base station system according to Embodiment 1 (FIG. 4).

In the base station system according to Embodiment 2, the BBU 12 transmits antenna weight coefficient information indicative of antenna weight coefficients of a plurality of antenna elements 205, and a time-domain signal prior to addition of cyclic prefix to the RAU 22 in the optical transmission path 30.

Further, in the base station system according to Embodiment 2, the RAU 22 multiplies the time-domain signal prior to addition of cyclic prefix by each of the antenna weight coefficients of the plurality of antenna elements 205, and generates weighted signals of the plurality of antenna elements 205. The RAU 22 adds cyclic prefixes to the weighted signals to transmit from the plurality of antenna elements 205.

The BBU 12 is different from the BBU 11 in FIG. 4 in the respect of not having the CP adding section 108. The MUX section 112 in FIG. 7 is different from the MUX section 112 in FIG. 4, and multiplexes the time-domain signal input from the P/S conversion section 107 and the antenna weight coefficient information input from the weight coefficient generating section 111 to output to the E/O conversion section 110. In addition, the time-domain signal input from the P/S conversion section 107 may be mapped to a data channel of the CPRI, while the antenna weight coefficient information may be mapped to a control channel of the CPRI.

The RAU 22 is provided with cyclic prefix (CP) adding sections 209 for each of the antenna elements 205, and in this respect, is different from the RAU 21 in FIG. 4. Each of the CP adding sections 209 adds a cyclic prefix to the weighted signal of the corresponding antenna element 205 to output to the corresponding D/A conversion section 203. Each of the D/A conversion sections 203 converts the weighted signal input from the corresponding CP adding section 209 from the digital signal into an analog signal to output to the corresponding RF function section 204.

As described above, in the base station system according to Embodiment 2, since the RAU 22 performs addition of cyclic prefix, it is possible to reduce the transmission amount of the optical transmission path 30, corresponding to the cyclic prefix, and it is possible to reduce the bandwidth required for the optical transmission path 30, as compared with the base station system (FIG. 4) according to Embodiment 1.

More specifically, in the optical transmission path 30, as shown in FIG. 7, it is essential only that it is possible to transmit the time-domain signal corresponding to n frequency-domain signals where n is the number of subcarriers, and the antenna weight coefficient information indicative of $N_T$ antenna weight coefficients where $N_T$ is the number of antenna elements. Therefore, as compared with the case where the BBU 11 adds the cyclic prefix (FIG. 4), it is possible to reduce the bandwidth required for the optical transmission path 30 in FIG. 7 corresponding to the cyclic prefix.

In addition, the base station system according to Embodiment 2 is also applicable to the base station system (see FIG. 6) for performing MIMO-transmission on transmission signals of a plurality of streams.

(Embodiment 3)

Figure 8:
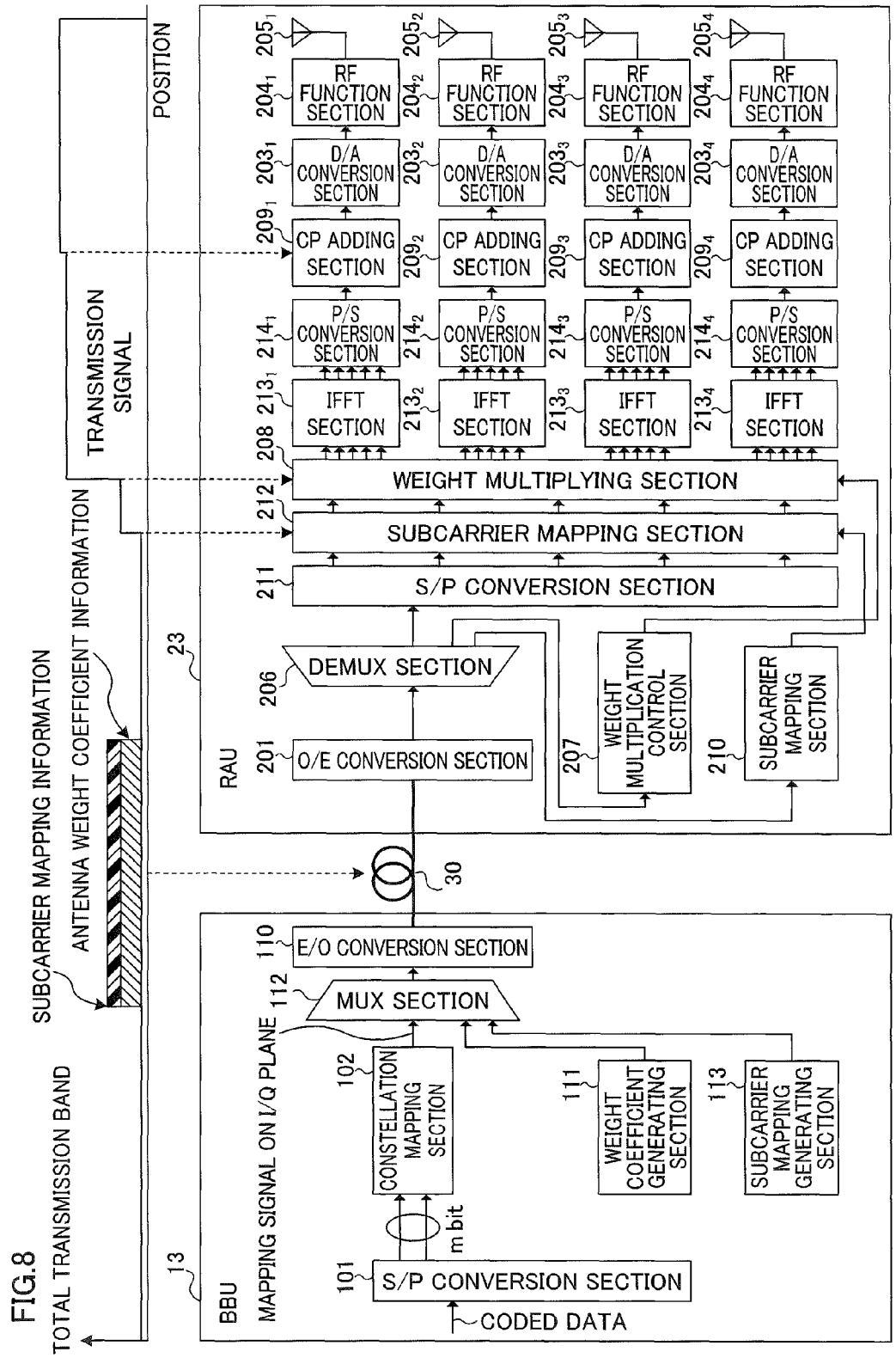
FIG. 8 is an explanatory diagram of a base station system according to Embodiment 3.

The base station system according to Embodiment 3 will be described with reference to FIG. 8. FIG. 8 is an explanatory diagram of the base station system according to Embodiment 3. As shown in FIG. 8, the base station system according to Embodiment 3 includes a BBU 13 (radio control apparatus), RAU 23 (radio apparatus) and optical transmission path 30 for connecting between the BBU 13 and the RAU 23. In addition, although not shown in the figure, the base station system may include a plurality of BBUs 13 and a plurality of RAUs 23. The following description will be given with emphasis on differences from the base station system according to Embodiment 2 (FIG. 7).

In the base station system according to Embodiment 3, the BBU 13 transmits antenna weight coefficient information indicative of antenna weight coefficients of a plurality of antenna elements 205 for each subcarrier, a mapping signal mapped onto the I/Q plane, and subcarrier mapping information (described later) to the RAU 23 in the optical transmission path 30.

Further, in the base station system according to Embodiment 3, based on the subcarrier mapping information (described later), the RAU 23 maps the mapping signal on the I/Q plane to subcarriers. The RAU 23 multiplies the frequency-domain signal mapped to the subcarrier by the antenna weight coefficients of the plurality of antenna elements 205 for each subcarrier, and generates weighted signals of the plurality of antenna elements 205 for each subcarrier. The RAU 23 adds cyclic prefixes to the weighted signals to transmit from the plurality of antenna elements 205.

The BBU 13 is provided with the S/P conversion section 101, a single constellation mapping section 102, electric/optical (E/O) conversion section 110, weight coefficient generating section 111, multiplexing (MUX) section 112, and subcarrier mapping generating section 113. On the other hand, as distinct from the BBU 12 in FIG. 7, the BBU 13 is not provided with the subcarrier mapping section 103, IFFT section 106, and P/S conversion section 107.

The S/P conversion section 101 converts coded data into 2-data sequences (m bits) for an in-phase component (I channel) and a quadrature component (Q channel) to output to the constellation mapping section 102. As distinct from FIGS. 3 and 4 and the like, the S/P conversion section 101 in FIG. 8 does not generate parallel data for each subcarrier.

The constellation mapping section 102 maps the data sequence input from the S/P conversion section 101 to the I/Q plane using various types of modulation schemes, and generates a mapping signal on the I/Q plane. The constellation mapping section 102 outputs the mapping signal on the I/Q plane to the MUX section 112.

The weight coefficient generating section 111 generates antenna weight coefficients of a plurality of antenna elements 205 for each subcarrier, and outputs antenna weight coefficient information indicative of the antenna weight coefficients to the MUX section 112. Thus, in Embodiment 3, the antenna weight coefficient information indicates the antenna weight coefficients of a plurality of antenna elements 205 for each subcarrier.

The subcarrier mapping generating section 113 generates the subcarrier mapping information to output to the MUX section 112. Herein, the subcarrier mapping information is information indicating subcarriers to which the mapping signal on the I/Q plane is mapped, and is generated based on a scheduling result such as resource mapping.

The MUX section 112 multiplexes the mapping signal on the I/Q plane input from the constellation mapping section 102, the antenna weight coefficient information input from the weight coefficient generating section 111, and the subcarrier mapping information input from the subcarrier mapping generating section 113, and outputs the resultant to the E/O conversion section 110. In addition, the mapping signal may be mapped to a data channel of the CPRI, while the antenna weight coefficient information and subcarrier mapping information may be mapped to a control channel of the CPRI.

The RAU 23 is provided with a subcarrier mapping control section 210, serial/parallel (S/P) conversion section 211, subcarrier mapping section 212, and Inverse Fast Fourier Transform (IFFT) sections 213 and parallel/serial (P/S) conversion sections 214 for each of the antenna elements 205, and in this respect, is different from the RAU 22 in FIG. 7.

As shown in FIG. 8, the DEMUX section 206 demultiplexes the input signal from the O/E conversion section 201 into the time-domain signal, the antenna weight coefficient information and the subcarrier mapping information. The DEMUX section 206 outputs the time-domain signal to the S/P conversion section 211, outputs the antenna weight coefficient information to the weight multiplication control section 207, and further outputs the subcarrier mapping information to the subcarrier mapping control section 210.

Based on the subcarrier mapping information, the subcarrier mapping control section 210 controls the subcarrier mapping section 212. More specifically, the subcarrier mapping control section 210 instructs the subcarrier mapping section 212 to map the mapping signal on the I/Q plane to which subcarriers.

The S/P conversion section 211 converts the serial mapping signal on the I/Q plane into n (herein, n=5) parallel mapping signals so as to divide and transmit the signal with n subcarriers, and outputs the signals to the subcarrier mapping section 212.

According to instructions from the subcarrier mapping control section 210, the subcarrier mapping section 212 maps each mapping signal on the I/Q plane input from the S/P conversion section 211 to a subcarrier. The subcarrier mapping section 212 outputs frequency-domain signals mapped to subcarriers to the weight multiplying section 208.

The weight multiplying section 208 distributes n (which is the number of subcarriers) frequency-domain signals input from the subcarrier mapping section 212 to each of a plurality of antenna elements 205. The weight multiplying section 208 multiplies n frequency-domain signals distributed to each antenna element 205 by the antenna weight coefficient to perform weighting. The weight multiplying section 208 outputs n frequency-domain signals weighted for each subcarrier to each of the IFFT sections 213.

The IFFT sections 213, P/S conversion sections 214, and CP adding sections 209 for each of the antenna elements 205 are the same as the IFFT sections 106, P/S conversion sections 107, and CP adding sections 108 for each of the antenna elements 205 in FIG. 3, and therefore, descriptions thereof are omitted. The D/A conversion section 203 for each antenna element 205 converts the weighted signal input from the corresponding CP adding section 209 from the digital signal into an analog signal, and outputs the signal to the corresponding R/F function section 204.

As described above, in the base station system according to Embodiment 3, since the RAU 23 performs subcarrier mapping, it is possible to reduce the transmission amount of the optical transmission path 30 corresponding to the number n of subcarriers, and it is possible to reduce the bandwidth required for the optical transmission path 30, as compared with the base station system (FIG. 7) according to Embodiment 2.

More specifically, in the optical transmission path 30, as shown in FIG. 8, transmitted are the mapping signal on the I/Q plane, the antenna weight coefficient information indicative of $n*N_T$ antenna weight coefficients (n=the number n of subcarriers, $N_T$=the number of antenna elements), and the subcarrier mapping information. The mapping information on the I/Q plane is not divided for each subcarrier, and therefore, it is possible to reduce the information amount as compared with the time-domain signal of Embodiment 2. In addition, the antenna weight coefficient information indicates $n*N_T$ antenna weight coefficients (n=the number n of subcarriers, $N_T$=the number of antenna elements), and therefore, as compared with Embodiment 2, the information amount of the antenna weight coefficient information is increased by n times.

In addition, the base station system according to Embodiment 3 is also applicable to the base station system (see FIG. 6) for performing MIMO-transmission on transmission signals of a plurality of streams.

(Embodiment 4)

Figure 9:
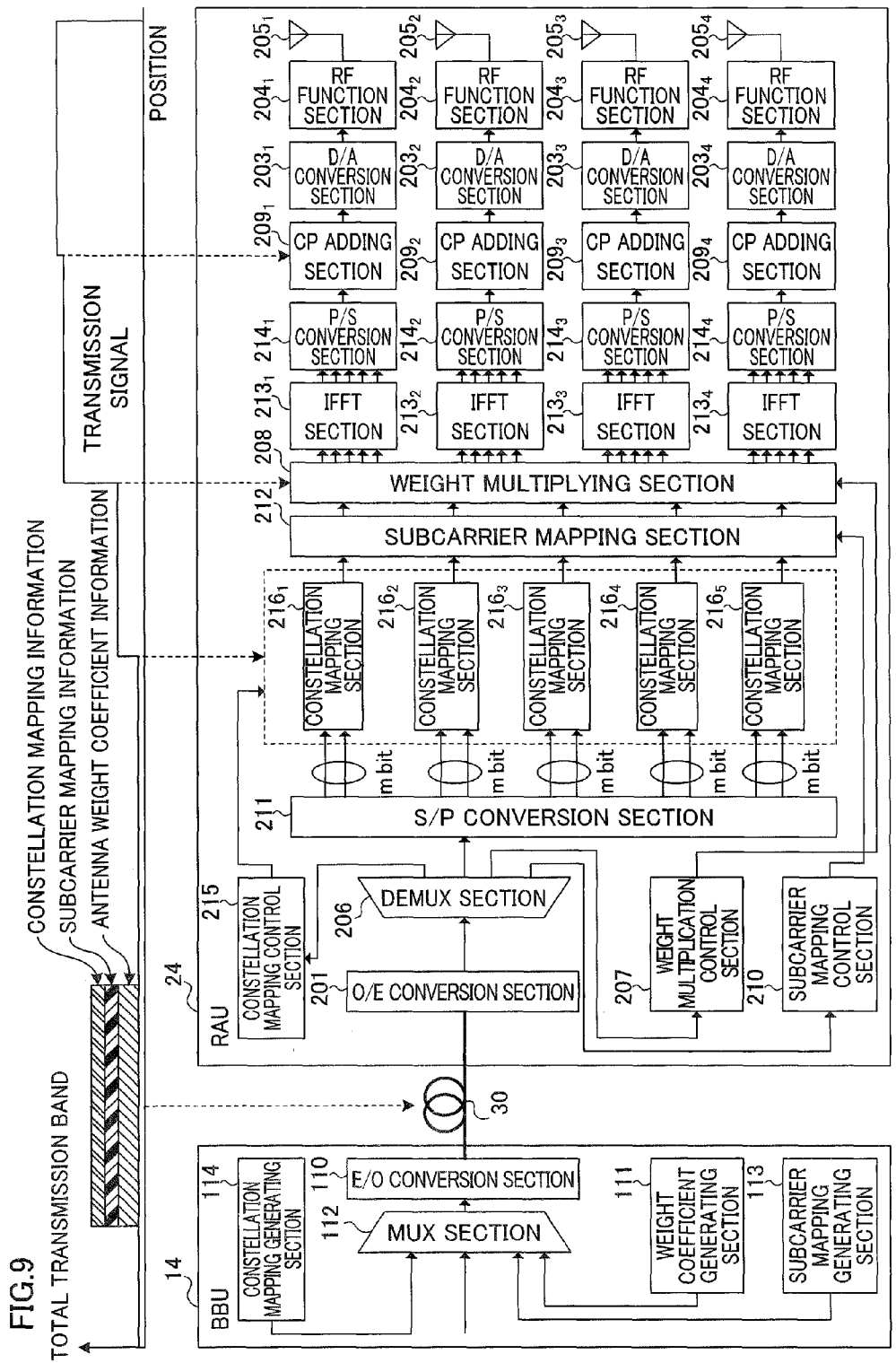
FIG. 9 is an explanatory diagram of a base station system according to Embodiment 4.

The base station system according to Embodiment 4 will be described with reference to FIG. 9. FIG. 9 is an explanatory diagram of one example of the base station system according to Embodiment 4. As shown in FIG. 9, the base station system according to Embodiment 4 includes a BBU 14 (radio control apparatus), RAU 24 (radio apparatus) and optical transmission path 30 for connecting between the BBU 14 and the RAU 24. In addition, although not shown in the figure, the base station system may include a plurality of BBUs 14 and a plurality of RAUs 24. The following description will be given with emphasis on differences from the base station system according to Embodiment 3 (FIG. 8).

In the base station system according to Embodiment 4, the BBU 14 transmits antenna weight coefficient information indicative of antenna weight coefficients of a plurality of antenna elements 205 for each subcarrier, subcarrier mapping information, constellation mapping information (described later) and coded data signal to the RAU 24 in the optical transmission path 30.

Further, in the base station system according to Embodiment 4, based on the constellation mapping information (described later), the RAU 24 maps the coded data signal onto the I/Q plane. The RAU 24 maps the mapping signal on the I/Q plane to a subcarrier. The RAU 24 multiplies the frequency-domain signal mapped to the subcarrier by the antenna weight coefficients of the plurality of antenna elements 205 for each subcarrier, and generates weighted signals of the plurality of antenna elements 205 for each subcarrier. The RAU 24 adds cyclic prefixes to the weighted signals to transmit from the plurality of antenna elements 205.

More specifically, the BBU 14 is provided with a constellation mapping generating section 114, without being provided with the S/P conversion section 101 and constellation mapping sections 102, and in this respect, is different from the BBU 13 in FIG. 8.

The constellation mapping generating section 114 generates the constellation mapping information. Herein, the constellation mapping information is information such as a modulation scheme required for constellation mapping.

The MUX section 112 multiplexes the coded data signal, the antenna weight coefficient information input from the weight coefficient generating section 111, the subcarrier mapping information input from the subcarrier mapping generating section 113, and the constellation mapping information input from the constellation mapping section 114, and outputs the resultant to the E/O conversion section 110. In addition, the coded data signal may be mapped to a data channel of the CPRI, while the antenna weight coefficient information, subcarrier mapping information and constellation mapping information may be mapped to a control channel of the CPRI.

The RAU 24 is provided with a constellation mapping control section 215, and constellation mapping sections 216 for each subcarrier, and in this respect, is different from the RAU 23 in FIG. 8. The DEMUX section 206 demultiplexes the input signal from the O/E conversion section 201 into the coded data signal, the antenna weight coefficient information, the subcarrier mapping information, and the constellation mapping information.

The DEMUX section 206 outputs the coded data signal to the S/P conversion section 211, outputs the antenna weight coefficient information to the weight multiplication control section 207, outputs the subcarrier mapping information to the subcarrier mapping control section 210, and further outputs the constellation mapping information to the constellation mapping control section 215.

Based on the constellation mapping information, the constellation mapping control section 215 controls each of the constellation mapping sections 216. More specifically, the constellation mapping control section 215 instructs each of the constellation mapping sections 216 to map the coded data signal onto the I/Q plane according to which modulation scheme.

According to instructions from the constellation mapping control section 215, each of the constellation mapping sections 216 maps a data sequence input from the S/P conversion section 101 to the I/Q plane. Each of the constellation mapping sections 216 outputs the information (symbol) mapped to the I/Q plane to the subcarrier mapping section 212.

The subcarrier mapping section 212, and IFFT sections 213, P/S conversion sections 214, CP adding sections 209, D/A conversion sections 203, and RF function sections 204 for each of the antenna elements 205 are the same as in FIG. 8, and therefore, descriptions thereof are omitted.

As described above, in the base station system according to Embodiment 4, since the RAU 24 performs mapping to the I/Q plane, it is possible to reduce the transmission amount of the optical transmission path 30 corresponding to the number n of subcarriers, and it is possible to reduce the bandwidth required for the optical transmission path 30, as compared with the base station system (FIG. 7) according to Embodiment 2.

More specifically, in the optical transmission path 30, as shown in FIG. 9, transmitted are the coded data signal, the antenna weight coefficient information indicative of $n*N_T$ antenna weight coefficients (n=the number n of subcarriers, $N_T$=the number of antenna elements), the subcarrier mapping information, and the constellation mapping information. The coded data signal is not divided for each subcarrier, and therefore, it is possible to reduce the information amount as compared with the time-domain signal of Embodiment 2.

In addition, the antenna weight coefficient information indicates $n*N_T$ antenna weight coefficients (n=the number n of subcarriers, $N_T$=the number of antenna elements), and therefore, as compared with Embodiment 2, the information amount of the antenna weight coefficient information is increased by n times. Further, as compared with Embodiment 3, the transmission amount of the optical transmission path 30 is increased corresponding to the information amount of the constellation mapping information.

In addition, the base station system according to Embodiment 4 is also applicable to the base station system (see FIG. 6) for performing MIMO-transmission on transmission signals of a plurality of streams.

As described above, the present invention is specifically described using the above-mentioned Embodiments, but it is obvious to a person skilled in the art that the invention is not limited to the Embodiments described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2013-211053 filed on Oct. 8, 2013, entire content of which is expressly incorporated by reference herein.

The invention claimed is:

1. A radio apparatus connected to a radio control apparatus with an optical transmission path, comprising:
   a plurality of antenna elements;
   a reception section that receives antenna weight coefficient information indicative of antenna weight coefficients of the plurality of antenna elements and a transmission signal from the radio control apparatus via the optical transmission path;
   a multiplying section that generates, based on the transmission signal, a plurality of distributed signals respectively corresponding to the plurality of antenna elements, and multiplies each distributed signal by the corresponding antenna weight coefficient indicated by the antenna weight coefficient information to generate weighted signals of the plurality of antenna elements; and
   a transmission section that transmits the weighed signals from the plurality of antenna elements,
   wherein the transmission signal is a time-domain signal subsequent to addition of cyclic prefix, and
   the multiplying section distributes the time-domain signal into the plurality of the distributed signals and multiplies each distributed signal by the corresponding antenna weight coefficient to generate weighted signals of the plurality of antenna elements.

2. The radio apparatus according to claim 1, wherein the antenna weight coefficient information indicates a first antenna weight coefficient and a second antenna weight coefficient of each of the plurality of antenna elements, and
   the multiplying section adds a multiplication result of a distributed signal corresponding to each antenna element by the corresponding first antenna weight coefficient, and a multiplication result of a delay signal of the distributed signal by the corresponding second antenna weight coefficient to generate weighted signals of the plurality of antenna elements.

3. A radio apparatus, connected to a radio control apparatus with an optical transmission path, comprising:
a plurality of antenna elements;
a reception section that receives antenna weight coefficient information indicative of antenna weight coefficients of the plurality of antenna elements and a transmission signal from the radio control apparatus via the optical transmission path;
a multiplying section that generates, based on the transmission signal, a plurality of distributed signals respectively corresponding to the plurality of antenna elements, and multiplies each distributed signal by the corresponding antenna weight coefficient indicated by the antenna weight coefficient information to generate weighted signals of the plurality of antenna elements; and
a transmission section that transmits the weighed signals from the plurality of antenna elements,
wherein the transmission signal is a time-domain signal prior to addition of cyclic prefix,
the multiplying section distributes the time-domain signal into the plurality of the distributed signals and multiplies each distributed signal by the corresponding antenna weight coefficient to generate weighted signals of the plurality of antenna elements, and
the transmission section adds the cyclic prefix to the weighted signals to transmit from the plurality of antenna elements.

4. The radio apparatus according to claim 3, wherein the antenna weight coefficient information indicates a first antenna weight coefficient and a second antenna weight coefficient of each of the plurality of antenna elements, and
the multiplying section adds a multiplication result of a distributed signal corresponding to each antenna element by the corresponding first antenna weight coefficient, and a multiplication result of a delay signal of the distributed signal by the corresponding second antenna weight coefficient to generate weighted signals of the plurality of antenna elements.

5. A radio apparatus connected to a radio control apparatus with an optical transmission path, comprising:
a plurality of antenna elements;
a reception section that receives antenna weight coefficient information indicative of antenna weight coefficients of the plurality of antenna elements and a transmission signal from the radio control apparatus via the optical transmission path;
a multiplying section that generates, based on the transmission signal, a plurality of distributed signals respectively corresponding to the plurality of antenna elements, and multiplies each distributed signal by the corresponding antenna weight coefficient indicated by the antenna weight coefficient information to generate weighted signals of the plurality of antenna elements;
a transmission section that transmits the weighed signals from the plurality of antenna elements; and
a subcarrier mapping section,
wherein the antenna weight coefficient information indicates antenna weight coefficients of the plurality of antenna elements for each subcarrier,
the transmission signal is a mapping signal mapped onto an I/Q plane,
the subcarrier mapping section maps the mapping signal to a subcarrier to generate a frequency-domain signal,
the multiplying section distributes the frequency-domain signal into the plurality of the distributed signals and multiplies each distributed signal by the corresponding antenna weight coefficient for each subcarrier to generate weighted signals of the plurality of antenna elements for each subcarrier, and
the transmission section converts the weighted signals into time-domain signals for each subcarrier, and adds the cyclic prefix to transmit from the plurality of antenna elements.

6. A radio apparatus connected to a radio control apparatus with an optical transmission path, comprising:
a plurality of antenna elements;
a reception section that receives antenna weight coefficient information indicative of antenna weight coefficients of the plurality of antenna elements and a transmission signal from the radio control apparatus via the optical transmission path;
a multiplying section that generates, based on the transmission signal, a plurality of distributed signals respectively corresponding to the plurality of antenna elements, and multiplies each distributed signal by the corresponding antenna weight coefficient indicated by the antenna weight coefficient information to generate weighted signals of the plurality of antenna elements;
a transmission section that transmits the weighed signals from the plurality of antenna elements; and
a constellation mapping section and a subcarrier mapping section,
wherein the antenna weight coefficient information indicates antenna weight coefficients of the plurality of antenna elements for each subcarrier,
the transmission signal is a coded data signal,
the constellation mapping section maps the coded data signal onto an I/Q plane to generate a mapping signal,
the subcarrier mapping section maps the mapping signal to a subcarrier to generate a frequency-domain signal,
the multiplying section distributes the frequency-domain signal into the plurality of the distributed signals and multiplies each distributed signal by the corresponding antenna weight coefficient for each subcarrier to generate weighted signals of the plurality of antenna elements for each subcarrier, and
the transmission section converts the weighted signals into time-domain signals for each subcarrier, and adds the cyclic prefix to transmit from the plurality of antenna elements.

* * * * *